United States Patent

Elverum, Jr.

[15] 3,699,772
[45] Oct. 24, 1972

[54] LIQUID PROPELLANT ROCKET ENGINE COAXIAL INJECTOR

[72] Inventor: Gerard W. Elverum, Jr., Rolling Hills, Calif.

[73] Assignee: TRW Inc., Redondo Beach, Calif.

[22] Filed: Jan. 8, 1968

[21] Appl. No.: 696,470

[52] U.S. Cl..................60/39.74 A, 60/258, 239/425
[51] Int. Cl..................................F02g 1/00
[58] Field of Search............................60/258, 39–74; 239/424.5, 425, 426, 548, 556, 560, 561

[56] References Cited

UNITED STATES PATENTS 3,093,157  6/1963  Aitken et al.................60/258
3,421,700  1/1969  Seamans, Jr..........60/39.74 A
3,462,950  8/1969  Chevalaz..............60/39.74 A

*Primary Examiner*—Samuel Feinberg
*Attorney*—George C. Thompson

[57] ABSTRACT

To provide combustion stability in rocket engines over a wide range of thrust, a coaxial injector is provided which includes an outer annular sleeve for introduction of one propellant and a hollow pintle with spaced slots for introduction of another propellant to impinge on the first propellant. The slots are staggered in location and size to permit initial interlocking of the propellants and, therefore, increased mixing and combustion performance.

1 Claim, 3 Drawing Figures

Gerard W. Elverum, Jr,
INVENTOR.
BY.

ATTORNEY.

3,699,772

LIQUID PROPELLANT ROCKET ENGINE COAXIAL INJECTOR

BACKGROUND OF THE INVENTION

This invention pertains to rocket engines and more particularly to a simple injector concept for interlocking two or more propellants to provide increased combustion efficiency and to provide a fundamental mechanism for achieving dynamically stable combustion in a wide range of engine sizes.

One of the greatest problems in rocket engines when two propellants are introduced through an injector for mixing, is that of achieving combustion stability. This problem of maintaining combustion stability has been present or can be initiated in nearly all rocket engines, and particularly as the size of the engine is increased. By using an injector concept in which all of the propellant is introduced into the chamber from the center region of the head end closure plate, the combustion process can be made dynamically stable in all engine sizes. This results from the energy source being located at the nodal point of the acoustic pressure field. However, a fundamental problem exists, particularly with hypergolic propellants, when the injection into the chamber is concentrated at the center of the engine. This problem with hypergolic propellant combustion is the degree of hydraulic mixing which determines both the propellant distribution and the heat available for vaporization. This mixing becomes increasingly limited as the injector element size is increased. As larger streams or solid sheets of very reactive oxidizer and fuel impinge on each other, prior art engines experienced only limited liquid mixing before gas and vapor generated at the innerface is present in sufficient quantity to partially separate the oxidizer and fuel streams. The result of this is that a certain percentage of the total propellant is deflected apart and remains unmixed, and any further mixing must occur downstream in the combustion chamber either by the relatively slow processes of diffusion or re-circulation. This results in decreased combustion efficiency in the engine. In addition to the problem of not obtaining sufficient mixing with larger element sizes, the concentration of the propellant into relatively unmixed pockets can cause high amplitude local pressure fluctuations if they reach explosion limits. These fluctuations may become quite severe in the fuel-rich regions of the chamber, and in some cases large enough pressure spikes to be destructive of the rocket engine walls can occur. In addition, these disturbances form the main source of triggers for combustion instability in the chamber.

In prior art structures, the problem of combustion instability has been resolved in some cases by accepting the possibility of the phenomena and statistically assuming that a certain percent of the engines will fail. Another way of solving this problem has been to provide baffles on the injector face or other types of acoustic energy absorbing devices in the combustion chamber to decrease the tangential or transverse and radial modes of pressure fluctuations. However, with these methods, for each change in engine size, much design and testing work is necessary to provide the proper baffle or absorber configuration and also to establish the other injector design parameters to provide a matched system. An example of this baffle construction is seen in the U.S. Patent to Mower et al., No. 3,200,589.

SUMMARY OF THE INVENTION

This invention obviates the problems and complexities of prior art structures by providing a single, centrally located coaxial injector with one propellant impinging on the other in an annular stream. The other propellant is introduced through geometrically staggered orifices having several different areas to provide penetration and interlocking of the oxidizer and fuel in the impingement zone prior to the occurrence of significant liquid and/or vapor phase reactions.

DESCRIPTION OF THE PREFERRED EMBODIMENTS

Figure 1:
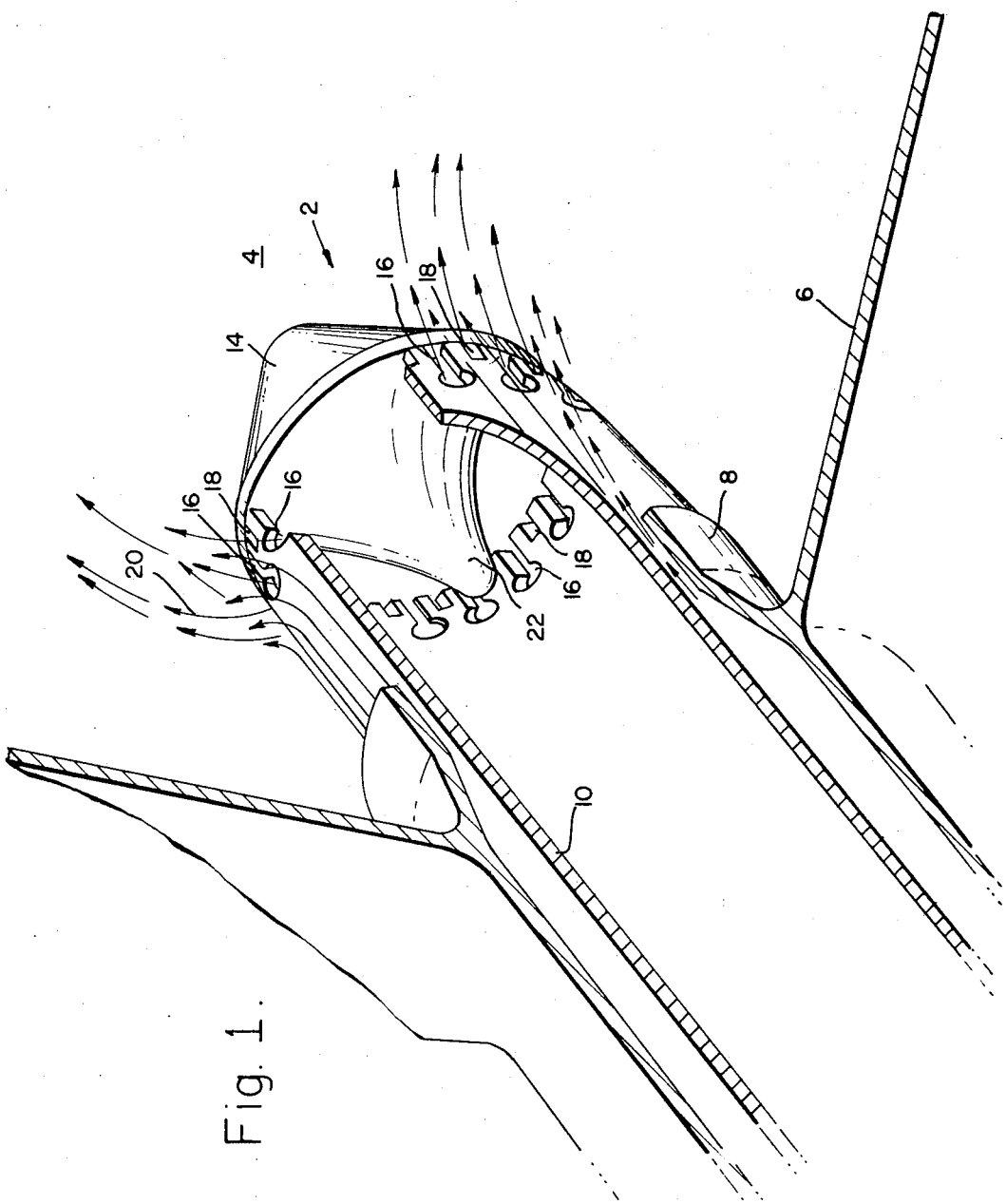
FIG. 1 is a perspective view, partially in cross section, of a coaxial injector according to this invention.
Figure 2:
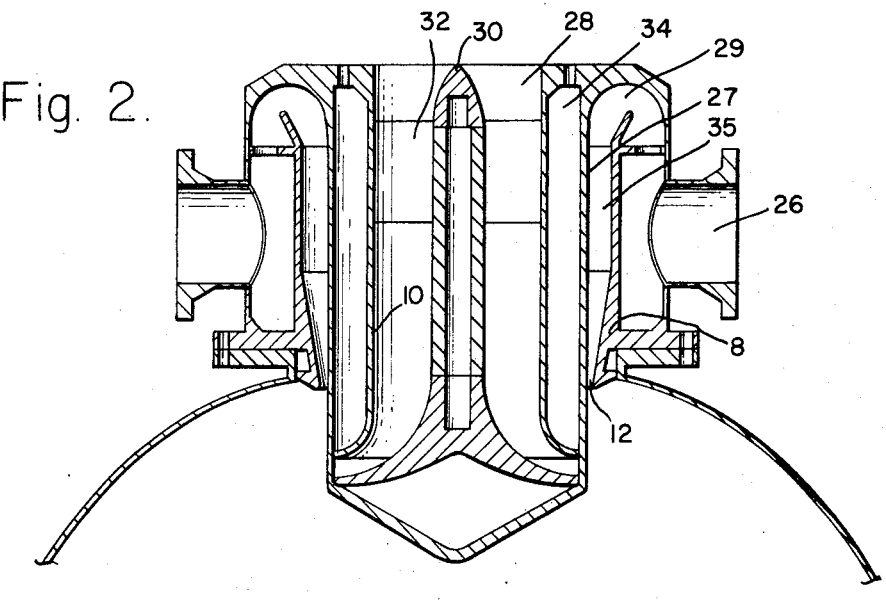
FIG. 2 is a view in cross section of an injector according to this invention.
Figure 3:
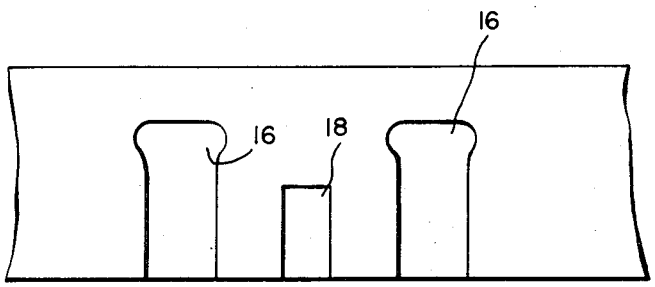
FIG. 3 illustrates the arrangement of slots in the pintle for introduction of one of the propellants.

Referring to FIG. 1, an injector constructed according to this invention is shown partially in cross section. The coaxial injector is shown generally at 2 and extends into the combustion chamber 4 which is formed or enclosed by combustion chamber wall 6. An outer annular sleeve 8 forms with hollow pintle 10 an annular orifice or slot 12 for introduction of propellant such as fuel in the direction of arrows 13. A closure or cap member 14 is attached to or integral with pintle 10. A first series of slots 16 alternate with a plurality of smaller slots 18 to allow propellant such as oxidizer introduced to the interior of pintle 10 to exit in a radial direction as shown by arrows 20, to penetrate, interlock and hydraulically mix with the propellant from annular orifice or slot 12. A cone shaped projection 22 diverts the propellant toward slots 16 and 18. In FIG. 2, the fuel ducts 26 are shown as illustrating one manner in which propellant is supplied to orifice or slot 12 through orifices 27 and manifold 29. Oxidizer enters at 28. A central member 30 is shown with supporting vanes 32 and 34 to provide support for the pintle tip. In a similar manner, vanes 35 are provided to properly space pintle 10 from sleeve 8. FIG. 3 is illustrative of the slots 16 and 18. In this connection, while slots 18 are shown as resembling a key hole, it is within this invention's scope to provide rectangular or other shaped slots. Similarly, the shape of slots 16 can be varied.

It has been found by applicant that the area of slots 16 relative to slots 18 are selected based on the propellant flow rate to pintle diameter ratio. The optimum range for the percentage of propellant which should flow through openings 16 lies between 5 and 50 percent. In addition, the unit spacing between the slots 18 is such as to be directly proportional to the thickness of the propellant sheet exiting orifice 12 such that radial and circumferential hydraulic interlocking of the two propellants is proportionately the same at all engine sizes.

In operation, propellant such as fuel is injected through orifice 12 in a substantially axial direction.

Propellant such as oxidizer exits in a radial direction through the staggered slots 16 and 18 to interlock and impinge with the fuel. By providing the small slot 18 between the main slots 16, an increase in efficiency is provided by additional mixing and reaction of the propellants which have been caused to bypass the larger slots. This hydraulic interlocking prior to reaction permits all of the propellants to be introduced at the center portion of the combustion chamber without attendant loss in combustion efficiency even in very large engines.

By this described configuration using a coaxial injection with the slot arrangement as shown and described, it has been found that regardless of engine size the problem of combustion instability no longer exists.

The damaging tangential modes of combustion instability which may be initiated by a disturbance in the combustion chamber or feed system is immediately dynamically damped by this central injection method. In addition, the first radial mode of instability is also effectively damped by this configuration.

Having described this invention, it is understood that it is to be limited only by the scope of the claims appended hereto.

I claim:

1. In a gas generating device having a combustion chamber, an injector and a throat area for exit of gas to produce thrust, that improvement in said injector which comprises:
   an outer annular sleeve member,
   an inner substantially hollow member, said outer and inner members forming an annular orifice for the introduction of a first propellant into said combustion chamber,
   said inner member having one end extending into said combustion chamber and having a closure substantially covering one end of said inner member, said one end having a plurality of first orifices adapted to allow a second propellant to interlock and mix with said first propellant,
   said one end further having a plurality of second orifices, each of said second orifices being circumferentially and axially spaced from said first orifices and said second orifices each having a cross-sectional area smaller than each of said first orifices wherein circumferential spacing of said first orifices is proportional to the thickness of said annular orifice.

* * * * *